UNITED STATES PATENT OFFICE.

WILLIAM W. HUNTLEY AND ABEL P. HOLCOMB, OF SILVER CREEK, N. Y.

IMPROVEMENT IN PROCESSES OF PURIFYING MIDDLINGS.

Specification forming part of Letters Patent No. 135,811, dated February 11, 1873.

*To all whom it may concern:*

Be it known that we, WILLIAM W. HUNTLEY and ABEL P. HOLCOMB, of Silver Creek, in the county of Chautauqua and State of New York, have invented an Improved Process for Purifying Middlings, of which the following is a specification:

In treating that portion of the products of ground grain termed "middlings," according to our newly-discovered process, we pass them into a machine which is provided with a disintegrator or whippers, so arranged that as the middlings enter it they shall be brought in contact with rapidly-moving whippers or beaters for the purpose of causing them to whip or beat loose from the valuable parts of said middlings any smut, dirt, or other foreign substance which may adhere thereto, and which would be injurious to the flour if allowed to remain in contact therewith while such valuable parts are being reground. While the above-named result is being accomplished a current of air is induced to flow through the chamber or space occupied by the whippers, it being caused by a suction or blast-fan, and being of sufficient force to take away and carry to any proper receptacle or to the atmosphere the smut, dust, or other substances detached by said whippers, but not of sufficient force to carry away any of the valuable parts of the material, such parts falling of their own gravity into some suitable receptacle, from which they are conducted to a suitable bolting or sifting device for the purpose of being separated into such parts as are to be reground, such as are already so fine as not to require regrinding, and such as are not of sufficient value to justify regrinding. After this separation has been made the coarser and most valuable parts of the material are returned to the eye of the stone and reground, either separately or in connection with unground grain, as may prove most desirable.

The first stage in our process is of great importance, as in grinding wheat the smut, more or less of which always adheres to the kernel when it passes between the stones, also adheres with great tenacity to the particles into which the kernels are broken when grinding, and consequently can only be detached therefrom by the act of whipping or beating it loose from such particles; and as it is a fact that the coarser particles of the middlings contain the most nutritious portion of the kernel it is important that such separation be thorough, in order that when the valuable parts are reground a white clean flour may be the result, as well as flour which is rich in gluten.

A very important advantage of this process of purifying middlings results from having the smut removed and carried away previous to the deposition of the middlings upon the sieves, so that the smut cannot now gum up the meshes of the sieves as it does in processes heretofore employed.

We have deemed it unnecessary to describe in this patent a machine for carrying out our process, as such a machine is described in detail in another patent, granted to us of even date with this, to which we refer for an explanation of the mechanical details.

We claim as our invention—

The mode of purifying middlings, previously to their being separated into different grades by bolts or sieves for regrinding, by subjecting them to the action of whippers or beaters while passing through a current of air, substantially in the manner as set forth.

In testimony whereof we have signed our names to this specification in the presence of two subscribing witnesses.

WILLIAM W. HUNTLEY.
ABEL P. HOLCOMB.

Witnesses:
 AMOS BOWEN,
 A. H. SPAULDING.